United States Patent [19]
Peterson

[11] Patent Number: 5,095,755
[45] Date of Patent: Mar. 17, 1992

[54] ISOLATOR FOR PRESSURE TRANSMITTER

[75] Inventor: Thomas P. Peterson, Chanhassen, Minn.

[73] Assignee: Rosemount Inc., Eden Prairie, Minn.

[21] Appl. No.: 607,572

[22] Filed: Nov. 1, 1990

[51] Int. Cl.⁵ .................. G01L 7/08; G01L 19/04
[52] U.S. Cl. ........................ 73/706; 73/708; 73/727; 338/3; 338/4
[58] Field of Search ............... 73/706, 708, 715, 716, 73/717, 718, 719, 720, 721, 722, 723, 724, 725, 726, 727, 728; 361/283; 338/4

[56] References Cited

U.S. PATENT DOCUMENTS

| | | | |
|---|---|---|---|
| 4,398,194 | 8/1983 | Johnston | 340/870.37 |
| 4,572,000 | 2/1986 | Kooiman | 73/718 |
| 4,798,089 | 1/1989 | Frick et al. | 73/706 |
| 4,934,193 | 6/1990 | Hayata | 73/706 |

FOREIGN PATENT DOCUMENTS 0111348 10/1983 United Kingdom ............ 113/2

OTHER PUBLICATIONS

"Flat and Corrugated Diaphragm Design and Handbook", by Mario Di Giovanni, Part 1, Chapters 1, 9 and 11; Part 3, Chapter 31.

Primary Examiner—Donald O. Woodiel
Attorney, Agent, or Firm—Kinney & Lange

[57] ABSTRACT

In a pressure transmitter, a central region of an isolator diaphragm with a substantially flat shape at an undeflected position near room temperature has a depressed shape at a deflected position at a colder temperature. The isolator diaphragm is over a shaped concavity in a transmitter body with a concave shape which corresponds to the depressed diaphragm shape to reduce output error.

13 Claims, 1 Drawing Sheet

ISOLATOR FOR PRESSURE TRANSMITTER

BACKGROUND OF THE INVENTION

This invention relates to pressure transmitters and fluid isolators for pressure transmitters.

Industrial pressure transmitters typically include an isolator for isolating a pressure sensing diaphragm in the transmitter from chemical attack by process fluids. Pressurized process fluid deflects an isolator diaphragm which pressurizes an isolator fluid such as silicone oil which deflects the sensing diaphragm. It is desirable to have the isolator diaphragm thin, flexible and compliant so that there is only a small pressure drop across it. On the other hand, it is desired to have at least a minimum thickness isolator diaphragm to avoid rupture of the isolator diaphragm with normal use under field conditions. This thickness of the isolator diaphragm is a compromise between conflicting requirements for compliance or deflectability and ruggedness.

Pressure drops across isolator diaphragms introduce errors in the pressure sensor output. Errors which are repeatable-type errors can be corrected for in calibration by linearization and temperature correction algorithms stored in a microcomputer in the transmitter which controls the transmitter output. Non-repeatable errors due to non-elastic deformation of the isolator diaphragm such as temperature hysteresis and line pressure hysteresis tend to be unpredictable and can't be simply corrected by algorithms. These unpredictable errors limit the performance of the transmitter, particularly its long term drift characteristics. Unpredictable errors tend to increase with high stress experienced by the isolator diaphragm, and it is thus desired to arrange an isolator in a transmitter which has a reduced amount of stress in the isolator diaphragm to reduce non-repeatable errors and long term drift.

SUMMARY OF THE INVENTION

The present invention relates to a pressure transmitter having a central region of an isolator diaphragm with a substantially flat shape at an undeflected position near room temperature and having a depressed shape at a deflected position at a colder temperature. The isolator diaphragm is over a shaped concavity in a transmitter body with a concave shape which corresponds to the depressed diaphragm shape to reduce output error.

The transmitter body has a surface including a rim around the shaped concavity. The concavity is coupled to a port in the transmitter via a passageway in the transmitter body. Isolator fluid in the depression and passageway couple pressure to the port. The isolator diaphragm isolates the concavity from received process fluid.

The isolator diaphragm has an outer region sealed to the rim surrounding a corrugated diaphragm region which surrounds the central diaphragm region. The isolator diaphragm has an undeflected position at a first temperature and a deflected position where it is deflected toward the concavity at a second lower temperature. A pressure sensor receives pressure from the port and generates a pressure output with improved accuracy.

DETAILED DESCRIPTION OF THE PREFERRED EMBODIMENTS

Figure 1:
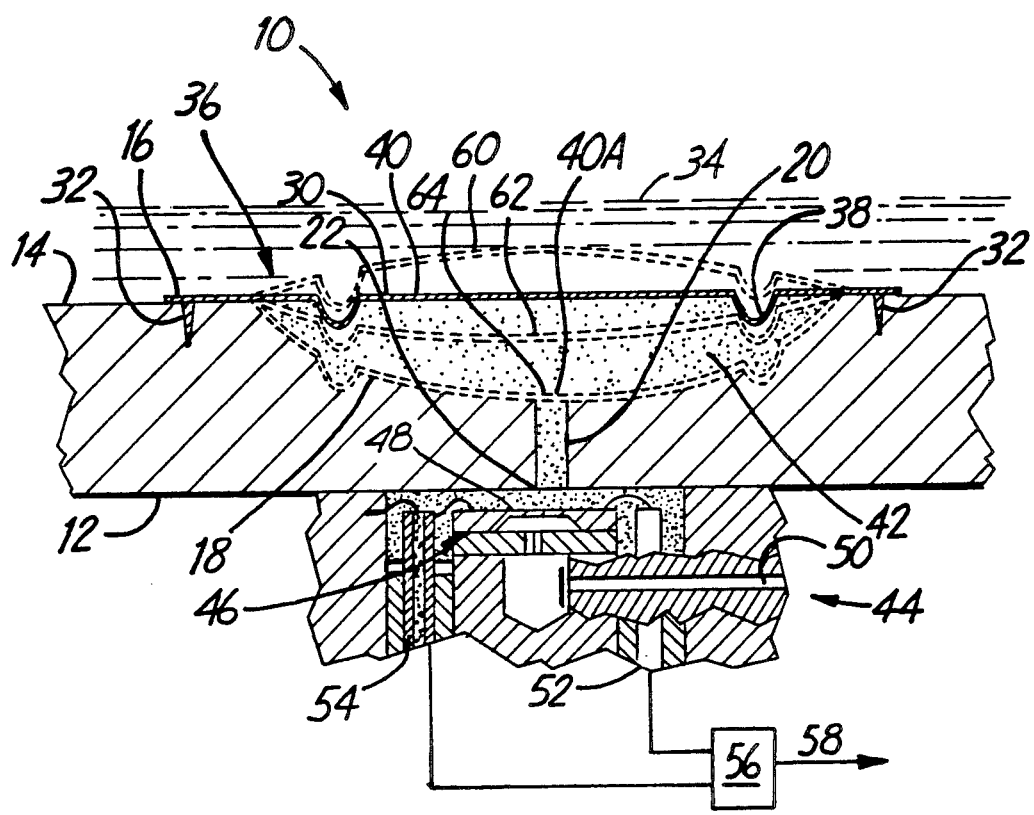
FIG. 1 is partial cross-section of a transmitter according to the invention.

In FIG. 1, a partial cross-section of pressure transmitter 10 is shown. In transmitter 10, body 12 such as a metal transmitter housing includes outwardly facing surface 14 surrounding a circular rim 16 of a concavity 18 formed in surface 14. Passageway 20 in transmitter body 12 connects concavity 18 to port 22 inside transmitter 10.

Isolator diaphragm 30 has a weld 32 to rim 16 to seal concavity 18 from process fluid 34 received by transmitter 10. An outer region 36 of diaphragm 30 is thus sealingly attached to rim 16. Outer region 36 joins and surrounds a corrugated region 38 of diaphragm 30. Corrugated region 38 can include a single corrugation as shown or multiple corrugations. Corrugated region 38, in turn, joins and surround central diaphragm region 40 of diaphragm 30. Diaphragm 30 is shaped by hydraulically pressing it against concavity 18 after welding. Diaphragm 30 then springs back to a neutral undeflected position shown in FIG. 1 with no differential pressure or stress applied to diaphragm 30. In the neutral, undeflected position shown at 30, central diaphragm region 40 is substantially flat. In FIG. 1, the vertical scale of diaphragm 30 and concavity 18 has been greatly exaggerated, by about a factor of 20. If diaphragm 30 and concavity 18 were shown to actual scale, the shapes of both diaphragm 30 and concavity 18 would appear nearly flat.

Isolator fluid 42 such as silicone oil fills concavity 18 and passageway 20 to couple process fluid pressure received by diaphragm 30 to port 22. At port 22, a pressure sensing arrangement 44 sealing covers port 22. Pressure sensing arrangement 44 includes a silicon pressure sensor 46 having a first side of sensing diaphragm 48 receiving the pressure from isolator fluid 42. A second, opposite side of sensing diaphragm 48 is vented to atmospheric pressure via passageway 50. Electrical feedthroughs 52, 54 connect pressure sensor output to a transmitter circuit 56 which provides a transmitter output 58 representative of the sensed pressure. Feedthrough 54 is a tube which provides for sealing a selected quantity of isolator fluid 42 in transmitter 10. The quantity of isolator fluid is adjusted so that central diaphragm region 40 has a substantially flat shape at room temperature.

Isolator fluid 42 expands when it is heated and contracts when it is cooled because it has a positive temperature coefficient of volumetric expansion. When transmitter 10 is at an elevated temperature, isolator fluid 42 expands. Since isolator fluid 42 is sealed in concavity 18, passageway 20 and pressure sensing arrangement 44, the flexible, compliant diaphragm bulges out from its neutral, unstressed position at room temperature to a position indicated by line 60 in FIG. 1. Likewise, as transmitter 10 is cooled, isolator diaphragm 30 deflects toward concavity 18 at a first low temperature as shown at line 62 and a second lower temperature as shown at line 64. When the diaphragm is at line 64, the diaphragm is still spaced away from the shaped surface of the concavity 18. Central diaphragm region 40A is depressed and the shaped surface of concavity 18 is selected to match the depression in isolator diaphragm 30. This arrangement permits a reduced quantity of isolator fluid in the isolator because there is no excess fluid due to mismatch of the shapes of the diaphragm and cavity at low temperature.

The position and shape of diaphragm 30 are thus a function of the quantity of isolator fluid and temperature. The quantity of isolator fluid is controlled, selected, or adjusted to place isolator diaphragm 30 in a substantially undeflected position near room temperature. The deflection below room temperature increases strain in the diaphragm and the deflection above room temperature also increases strain in the diaphragm because the diaphragm is in a neutral strain condition in the undeflected position.

Pressure sensor 46 has a sensing diaphragm having a diameter substantially smaller than the isolator diaphragm 30 which takes advantage of the improved isolator arrangement. Isolator fluid 42 flows from the concavity to the pressure sensor when process pressure increases. The quantity of isolator fluid flowing from the concavity due to pressurization is smaller than contraction of the isolator fluid due to fluid contraction at the lower temperature.

The outer region of the diaphragm is sealed to the rim at a rim diameter and the corrugated region is placed at a corrugation diameter. The corrugation diameter is between 50% and 65% of the rim diameter. Diaphragm deflection is substantially radially symmetrical. The corrugated region supports the cental diaphragm region adequately while not unduly stiffening the outer diaphragm region.

Figure 2:
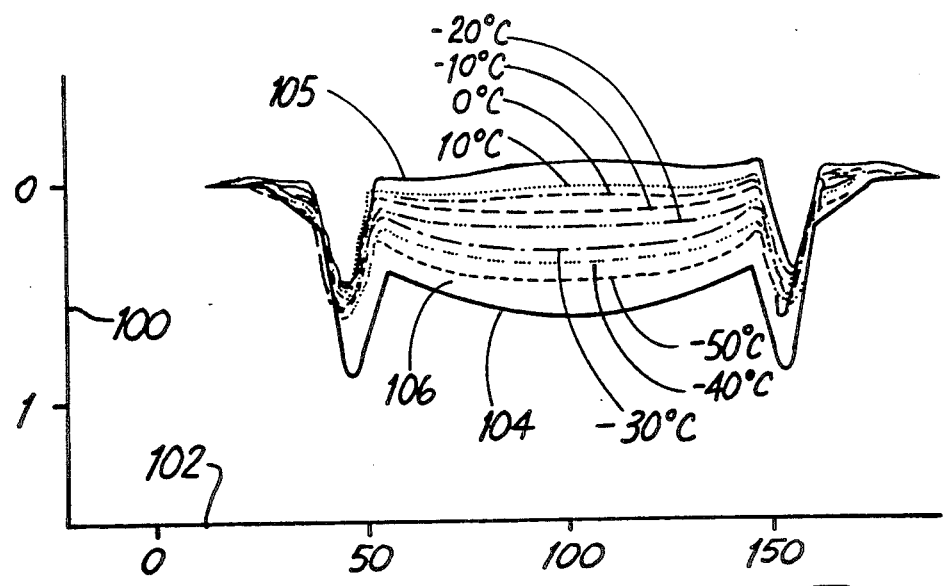
FIG. 2 is a representation of successive positions of an isolator diaphragm according to the present invention as temperature changes.

In FIG. 2, a more detailed representation of diaphragm and cavity shapes is shown. In FIG. 2, a vertical axis 100 is expanded by a factor 50 compared with horizontal axis 102. A concavity shape is shown at 104 and a diapragm shape at room temperature is shown at 105. Successive positions of the diaphragm at indicated temperatures are shown between lines 104 and 105. As can be seen in FIG. 2, depression of the central diaphragm region is quite pronounced at low temperatures and providing a corresponding concave shape to the concavity at a selected low temperature limits the amount of excess isolator fluid in the isolator. A small spacing 106 is left between the isolator diaphragm and the concavity at low temperature to allow for manufacturing tolerances and displacement of isolator fluid due to deflection of the sensor diaphragm.

Although the present invention has been described with reference to preferred embodiments, workers skilled in the art will recognize that changes may be made in form and detail without departing from the spirit and scope of the invention.

What is claimed is:

1. A pressure transmitter, comprising:
    a body having a surface including a rim around a shaped concavity coupled to a port in the transmitter via a passageway in the body, the concavity having a central region surface portion;
    a diaphragm isolating the concavity from received process fluid, the diaphragm having an outer region sealed to the rim surrounding a corrugated diaphragm region which surrounds an uncorrugated central diaphragm region, overlying the central region of the concavity, the diaphragm having an undeflected position at a first temperature and a deflected position where it is deflected toward the concavity at a second lower temperature;
    isolator fluid in the concavity and passageway coupling pressure to the port; and
    a pressure sensor receiving pressure from the port and generating a pressure output;
    the central region of the diaphragm having a substantially flat shape at the undeflected position and having a depressed shape at the deflected position, the concavity central region surface portion having a concave shape corresponding to the depressed shape of the diaphragm to reduce output error due to temperature variations.

2. The transmitter of claim 1 wherein the diaphragm position is a function of the quantity and the temperature of the isolator fluid.

3. The transmitter of claim 2 wherein the quantity of isolator fluid is selected to place the diaphragm in the undeflected position near room temperature.

4. The transmitter of claim 3 wherein the isolator fluid contracts at the lower temperature to deflect the central diaphragm region toward the concavity, the diaphragm central region having a preformed concave shape and moving toward its preformed concave shape as it approaches the concavity central region surface portion.

5. The transmitter of claim 4 wherein the isolator fluid expands above room temperature to deflect the central diaphragm region away from the concavity.

6. The transmitter of claim 5 wherein the deflection below room temperature increases strain in the diaphragm and the deflection above room temperature also increases strain in the diaphragm such that the diaphragm is in a neutral strain condition in the undeflected position.

7. The transmitter of claim 1 wherein the pressure sensor comprises a sensing diaphragm having a diameter substantially smaller than the diaphragm isolating the process fluid from the isolator fluid.

8. The transmitter of claim 7 wherein a quantity of isolator fluid flows from the concavity to the pressure sensor when process pressure increases.

9. The transmitter of claim 8 wherein the quantity of isolator fluid flowing from the cavity due to pressurization is smaller than contraction of the isolator fluid due to fluid contraction at the lower temperature.

10. The transmitter of claim 1 wherein the outer region of the diaphragm is sealed to the rim at a rim diameter and the corrugated region is placed at a corrugation diameter, the corrugation diameter being between 50% and 65% of the rim diameter such that diaphragm deflection is substantially radially symmetrical.

11. The transmitter of claim 10 wherein the corrugated region comprises a circular corrugation.

12. The transmitter of claim 10 wherein the corrugated region comprises multiple corrugations.

13. A pressure transmitter, comprising:
    a body having a surface including a rim around a shaped concavity coupled to a port in the transmitter via a passageway in the body, the concavity being defined by a surface portion that has a central region;
    a diaphragm isolating the concavity from received process fluid, the diaphragm having an outer region sealed to the rim surrounding a corrugated diaphragm region which surrounds a smooth uncorrugated central diaphragm region, the diaphragm having an undeflected position at a first temperature and a deflected position where it is deflected toward and is closely spaced from the concavity surface portion at the central region at a second lower temperature;

isolator fluid in the concavity and passageway coupling pressure to the port; and a pressure sensor receiving pressure from the port and generating a pressure output;

the central region of the diaphragm having a substantially flat shape at the undeflected position and having a preformed, concave depressed shape at the deflected position, the surface portion at the central region of the concavity having a substantially smooth, uncorrugated concave shape corresponding to the preformed depressed shape of the diaphragm to reduce output error by reducing the volume of fluid between the diaphragm and the surface of the concavity to reduce effects of temperature variations.

* * * * *